(12) United States Patent
Lin et al.

(10) Patent No.: US 11,849,253 B2
(45) Date of Patent: Dec. 19, 2023

(54) TRANSMITTER DEVICE APPLIED TO VIDEO CONFERENCE SYSTEM

(71) Applicant: BenQ Corporation, Taipei (TW)

(72) Inventors: Cheng-Pu Lin, Taipei (TW); Chen-Chi Wu, Taipei (TW); Chia-Nan Shih, Taipei (TW); Chin-Fu Chiang, Taipei (TW); Jung-Kun Tseng, Taipei (TW); Chuang-Wei Wu, Taipei (TW)

(73) Assignee: BENQ CORPORATION, Taipei (TW)

( * ) Notice: Subject to any disclaimer, the term of this patent is extended or adjusted under 35 U.S.C. 154(b) by 0 days.

(21) Appl. No.: 17/663,662

(22) Filed: May 16, 2022

(65) Prior Publication Data

US 2023/0171378 A1 Jun. 1, 2023

(30) Foreign Application Priority Data

Nov. 30, 2021 (TW) ................................ 110144721

(51) Int. Cl.
*H04L 65/403* (2022.01)
*H04N 7/14* (2006.01)
*H04N 7/15* (2006.01)

(52) U.S. Cl.
CPC .......... *H04N 7/148* (2013.01); *H04L 65/403* (2013.01); *H04N 7/142* (2013.01); *H04N 7/15* (2013.01)

(58) Field of Classification Search
CPC ...... H04L 65/403; H04N 7/142; H04N 7/148; H04N 7/15; H04N 7/147
USPC ........................................... 348/14.01–14.16
See application file for complete search history.

(56) References Cited

U.S. PATENT DOCUMENTS

| 2005/0195273 | A1* | 9/2005 | Yamamoto | H04N 7/142 348/14.02 |
| 2009/0285131 | A1* | 11/2009 | Knaz | H04W 4/16 348/14.09 |
| 2014/0043423 | A1* | 2/2014 | Lindberg | H04L 65/1053 348/14.01 |
| 2021/0203884 | A1 | 7/2021 | You et al. | |

FOREIGN PATENT DOCUMENTS

| CN | 103327290 B | 12/2016 | |
| CN | 113132671 A | 7/2021 | |
| EP | 1185116 A2 * | 3/2002 | ........... H04Q 3/0016 |
| WO | WO-0199410 A2 * | 12/2001 | ............. G11C 5/145 |

* cited by examiner

*Primary Examiner* — Melur Ramakrishnaiah
(74) *Attorney, Agent, or Firm* — MUNCY, GEISSLER, OLDS & LOWE, P.C.

(57) ABSTRACT

A transmitter device applied to a conference system is disclosed. The conference system further includes a receiver device. The receiver device wirelessly receives an image signal transmitted by the transmitter device, and a display coupled to the receiver device displays the image signal. The transmitter device includes a memory storing an identity information corresponding to an authority of the transmitter device. When the transmitter device is coupled to an information processing device, the transmitter device transmits the identity information to the information processing device. An application driver of the information processing device determines the authority of the transmitter device according to the identity information.

17 Claims, 14 Drawing Sheets

TRANSMITTER DEVICE APPLIED TO VIDEO CONFERENCE SYSTEM

BACKGROUND OF THE INVENTION

1. Field of the Invention

The invention relates to a conference system; in particular, to a transmitter device applied to the video conference system.

2. Description of the Prior Art

In recent years, thanks to the rapid development of the internet and video processing, multiple users in different places can synchronize video connections through electronic devices such as computers, smart phones, and tablet computers. In addition, users can also see dynamic images of other users through the screen during voice calls, so as to enhance the realism and presence of communication. Therefore, a video conference with both video and audio transmission has gradually replaced a conference call with only audio transmission as a common and efficient communication method.

Generally speaking, in the situation of a video conference, users with different identities usually have different authorities and operation interfaces. For example, a teacher or a presenter usually has a higher authority and an operation interface with more functions, while students or attendees only need a lower authority and an operation interface with fewer functions.

However, the current video conferencing system is equipped with an application (APP), which still requires users to perform complicated pre-setting process according to their different identities before starting the video conference smoothly; therefore, it is difficult to be accustomed to get started easily in operation for the users of different age groups and industries.

For example, since there are usually multiple classrooms or meeting rooms on the same floor of a school, when a teacher enters a class and wants to use an application of a notebook for screen projection, in addition to the complicated pre-setting process according to the teacher's identity, a long list of connectable receiver devices (RX) will appear in the application. At this time, it is difficult for even the teacher in charge of teaching to select the correct receiver device from the list immediately, and may even be mistakenly connected to the receiver device of other classrooms or conference rooms, not to mention the students who are inexperienced in operation. In addition, since the conventional video conferencing system cannot be compatible with all operating system platforms, when different participants use different operating systems or hardware platforms, they still need the support of the information department to successfully conduct the video conference, which is quite inconvenient.

As can be seen from the above, the above problems encountered in the prior arts still need to be further solved.

SUMMARY OF THE INVENTION

Therefore, a scope of the invention is to disclose a video conference system and an automatic identification method, which can automatically identify unique identities of different users according to their transmitter devices (TX) and automatically provide corresponding application interfaces and automatically connect the transmitter device to the correct receiver device (RX), which greatly simplifies the original complicated pre-setting process, so that the effect of "plug and play" can be achieved when the transmitter devices of different users are coupled to the information processing devices. In addition, it can be compatible with different operating system platforms (such as Android, iOS, Windows, Mac, etc.) used by different participants through the receiver device (RX) with control commands and position vector functions, so the above problems encountered in the prior art can effectively solved.

A preferred embodiment of the invention is a first transmitter device applied to a video conference system. In this embodiment, the conference system further includes a receiver device. The receiver device wirelessly receives a first image signal transmitted by the first transmitter device, and a display coupled to the receiver device displays the first image signal. The first transmitter device includes a first memory storing a first identity information corresponding to a first authority of the first transmitter device. When the first transmitter device is coupled to a first information processing device, the first transmitter device transmits the first identity information to the first information processing device. A first application driver of the first information processing device determines the first authority of the first transmitter device according to the first identity information.

In an embodiment, the first application driver also correspondingly provides a first application interface to the first transmitter device according to the first authority, or the first application driver activates the first application interface originally stored in the first information processing device according to the first authority, or the first application driver correspondingly downloads the first application interface to the first information processing device according to the first authority and activates the first application interface.

In an embodiment, the first application interface of the first information processing device sends a control signal to control the function of the second transmitter device.

In an embodiment, the second transmitter device has a physical button, and the physical button is used to notify the receiver device to output a second image signal from the second information processing device to the display, and the control signal is used to disable the physical button.

In an embodiment, the second transmitter device includes a second memory for storing a second identity information, and the second identity information corresponds to a second authority of the second transmitter device.

In an embodiment, the control signal is transmitted from the first information processing device to the second transmitter device through the first transmitter device or the control signal is directly transmitted from the first information processing device to the second transmitter device to disable at least one function of the second transmitter device.

In an embodiment, the first transmitter device and the second transmitter device are both connected with the receiver device, and the control signal is transmitted from the first information processing device to the receiver device through the first transmitter device or the control signal is directly transmitted from the first information processing device to the receiver device, so that the receiver device receives the second image signal provided by the second transmitter device but does not provide it to the display for display, or the control signal is sequentially sent from the first information processing device to the second transmitter device through the first transmitter device and the receiver device to disable at least one function of the second transmitter device.

In an embodiment, the first information processing device and the second transmitter device are both in the same network domain, and the first information processing device transmits the control signal to the second transmitter device through the network domain to disable at least one function of the second transmitter device.

In an embodiment, when the second transmitter device is coupled to the second information processing device, the second transmitter device transmits the second identity information to the second information processing device, and an application driver of the second information processing device determines a second authority of the second transmitter device according to the second identity information.

In an embodiment, the second application driver of the second information processing device further provides a second application interface to the second transmitter device according to the second authority, or the second application driver correspondingly activates the second application interface originally stored in the second information processing device according to the second authority, or the second application driver correspondingly downloads the second application interface to the second information processing device according to the second authority and activates the second application interface.

In an embodiment, the first application interface of the first information processing device sends a control signal to disable at least one function of the second application interface of the second information processing device.

In an embodiment, the first application driver of the first information processing device obtains the first transmitter device and its first authority corresponding to the first identity information from a transmitter device list stored therein.

In an embodiment, the first application driver of the first information processing device determines the first authority corresponding to the first transmitter device according to a role information provided by the first transmitter device.

In an embodiment, a level of the first authority of the first transmitter device is higher than a level of the second authority of the second transmitter device.

In an embodiment, the number of functions of the first application interface is greater than the number of functions of the second application interface.

In an embodiment, an operation request sent by the second application interface can only be performed after the first application interface agrees.

In an embodiment, the first application interface controls a screen projection display mode of the display through the receiver device and designates the display to display one or more screen projection windows in the screen projection display mode.

In an embodiment, when the second application interface sends a screen projection request to the receiver device, the receiver device needs to be approved by the first application interface before transmitting a projection screen of the second application interface to the display for display according to the screen projection request.

In an embodiment, the receiver device has the functions of control commands and location vectors, so that different operating system platforms in the same network domain can directly control related operations through websites or applications.

The advantage and spirit of the invention may be understood by the following detailed descriptions together with the appended drawings.

BRIEF DESCRIPTION OF THE APPENDED DRAWINGS

Figure 4A:
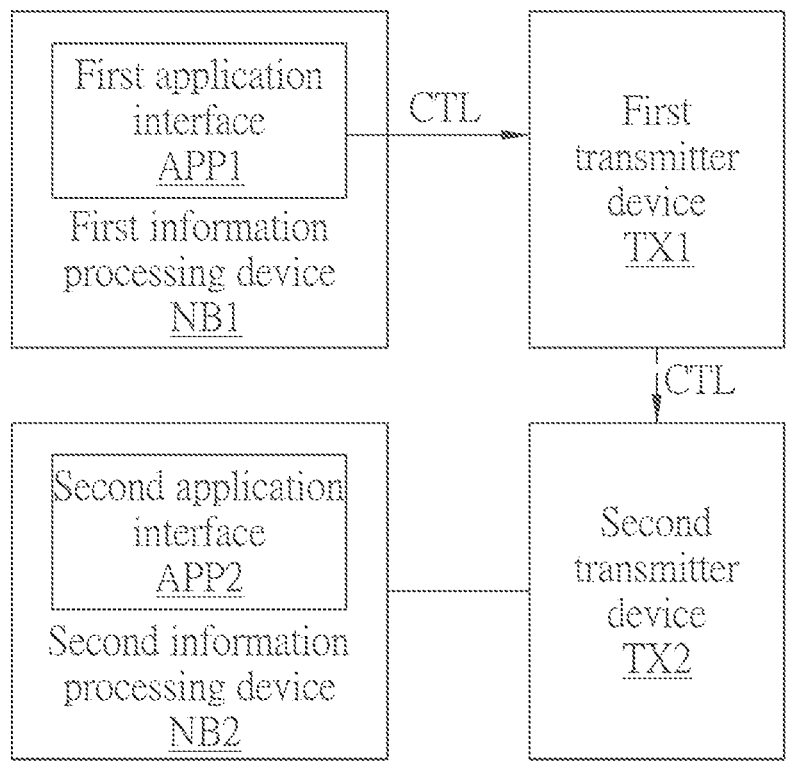
FIG. 4A illustrates a schematic diagram that a control signal sent by the first application interface of the first information processing device is transmitted to the second transmitter device through the first transmitter device to disable at least one function of the second transmitter device.
Figure 4B:
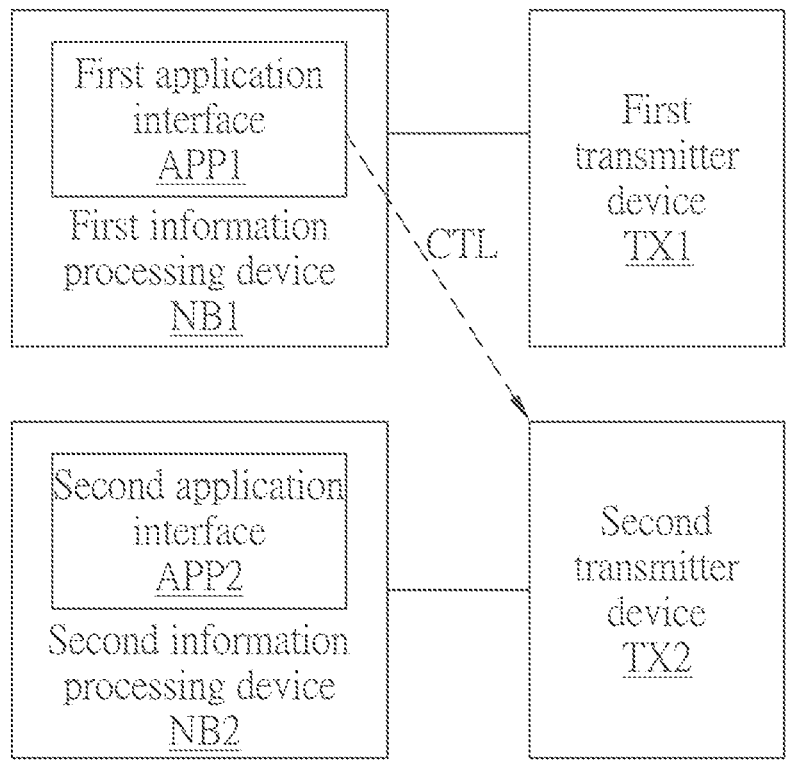
FIG. 4B illustrates a schematic diagram that the control signal sent by the first application interface of the first information processing device is directly transmitted to the second transmitter device to disable at least one function of the second transmitter device.
Figure 4C:
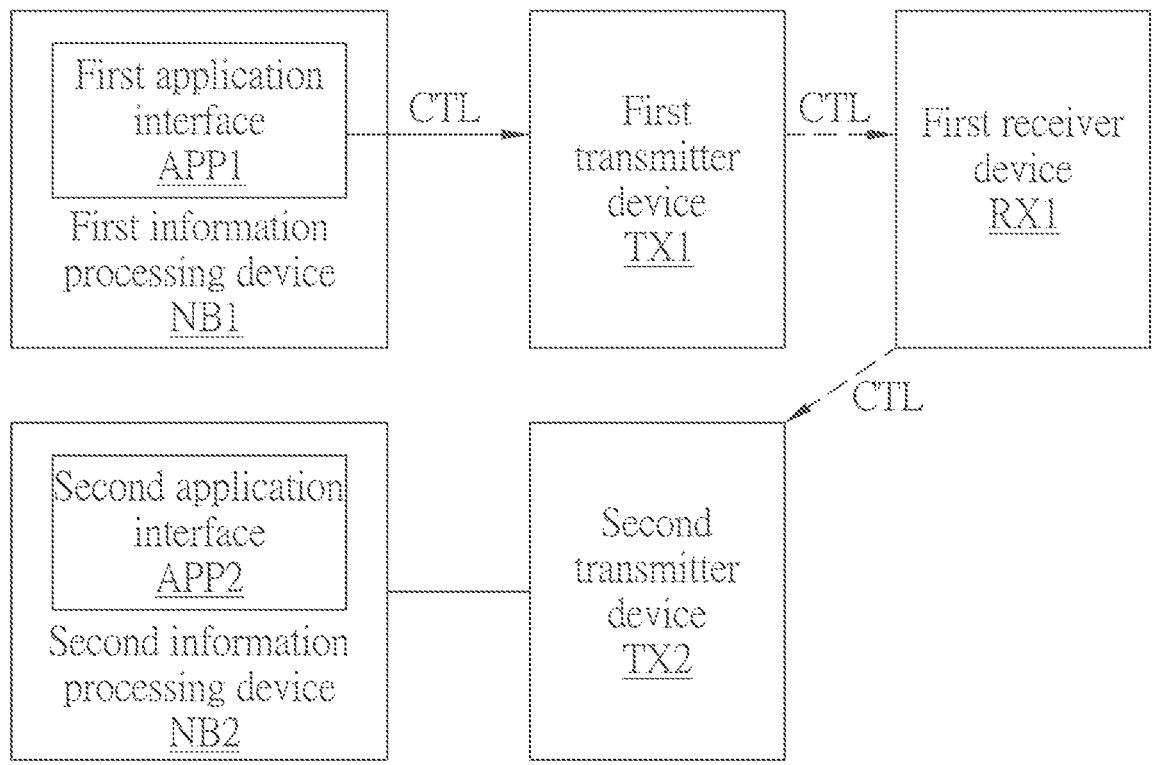
FIG. 4C illustrates a schematic diagram that the control signal sent by the first application interface of the first information processing device is sequentially transmitted to the second transmitter device through the first transmitter device and the first receiver device to disable at least one function of the second transmitter device.
Figure 4D:
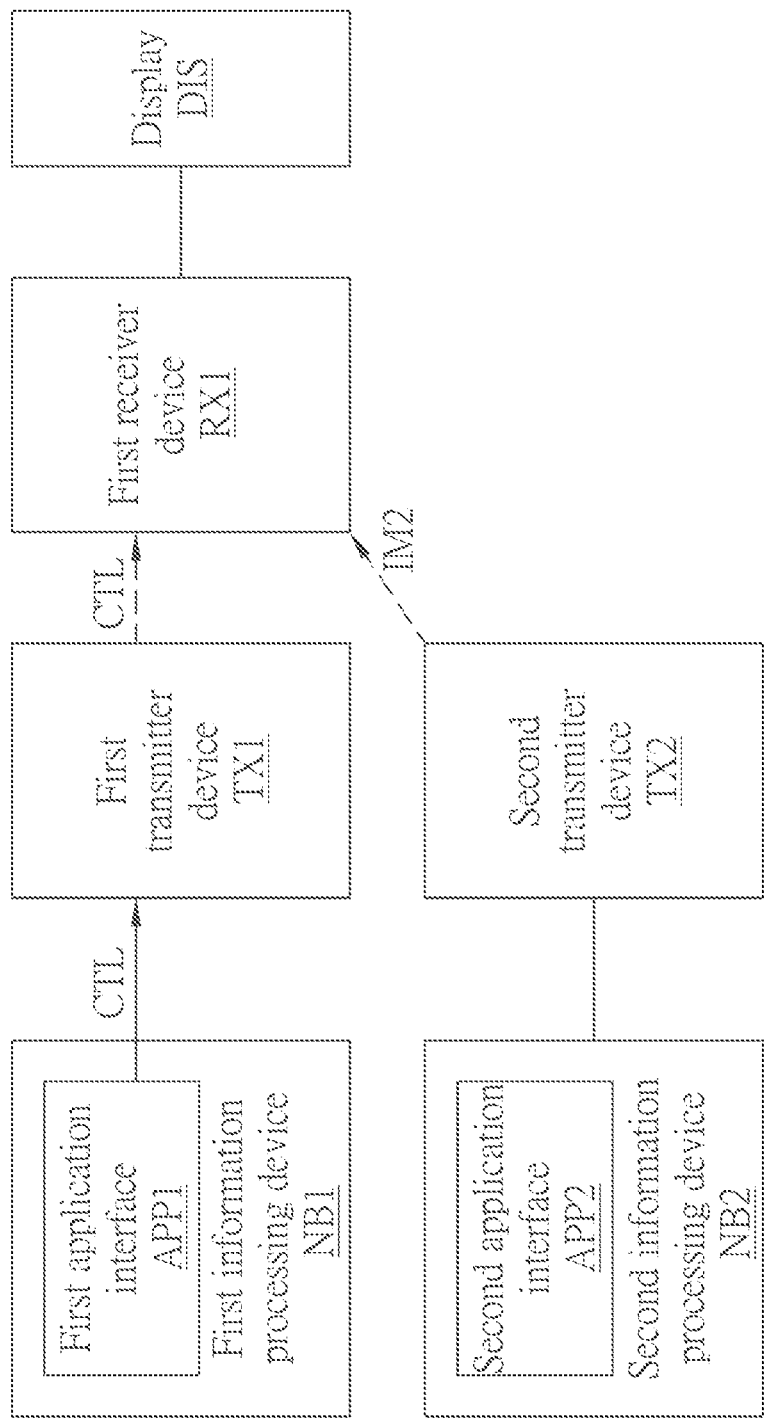

FIG. 4D illustrates a schematic diagram that the control signal sent by the first application interface of the first information processing device is transmitted to the first receiver device through the first transmitter device, so that although the first receiver device has received the second image signal provided by the second transmitter device, the first receiver device does not provide the second image signal to the display for display.

Figure 4E:
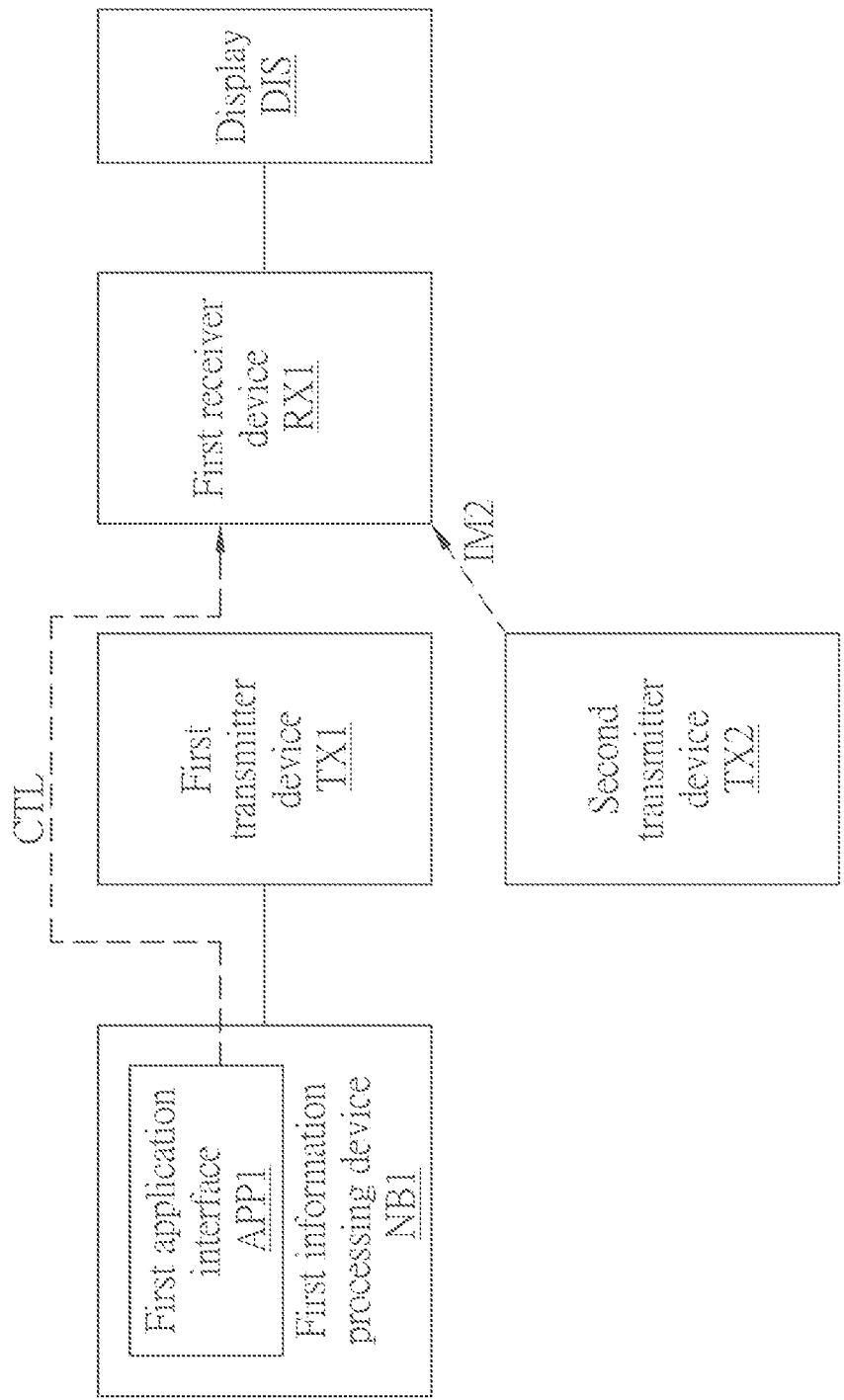

FIG. 4E illustrates a schematic diagram that the control signal sent by the first application interface of the first information processing device is directly transmitted to the first receiver device, so that although the first receiver device has received the second image signal provided by the second transmitter device, the first receiver device does not provide the second image signal to the display for display.

Figure 4F:
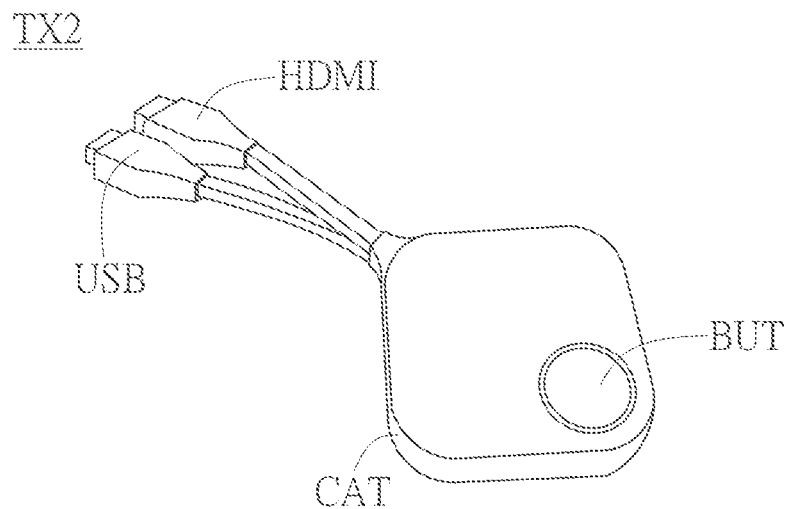

FIG. 4F illustrates a schematic diagram of the appearance of a second transmitter device having a connection line supporting universal serial bus (USB) and high-definition multimedia interface (HDMI).

Figure 4G:
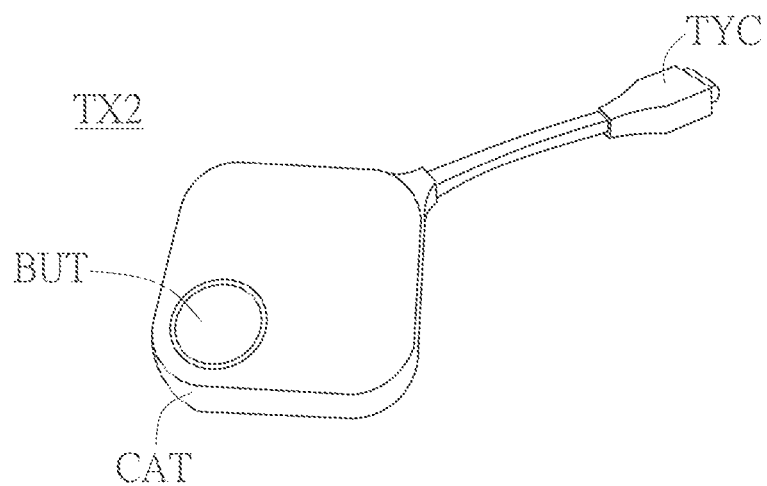

FIG. 4G illustrates a schematic diagram of the appearance of the second transmitter device having the connection line supporting USB Type-C alternate mode.

Figure 5A:
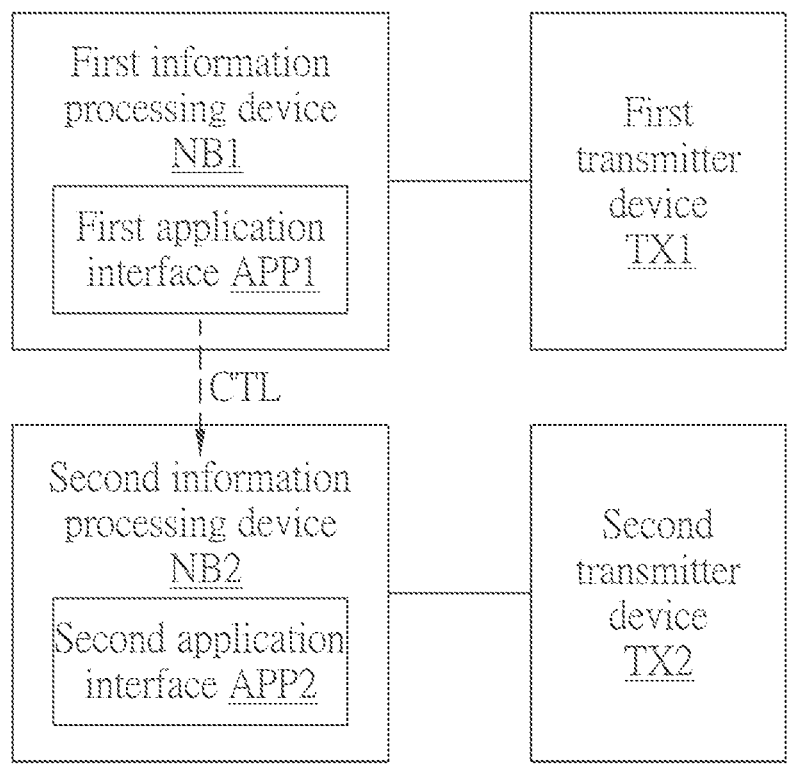

FIG. 5A illustrates a schematic diagram that the control signal sent by the first application interface of the first information processing device is directly transmitted to the second information processing device to disable at least one function of the second application interface of the second information processing device.

Figure 5B:
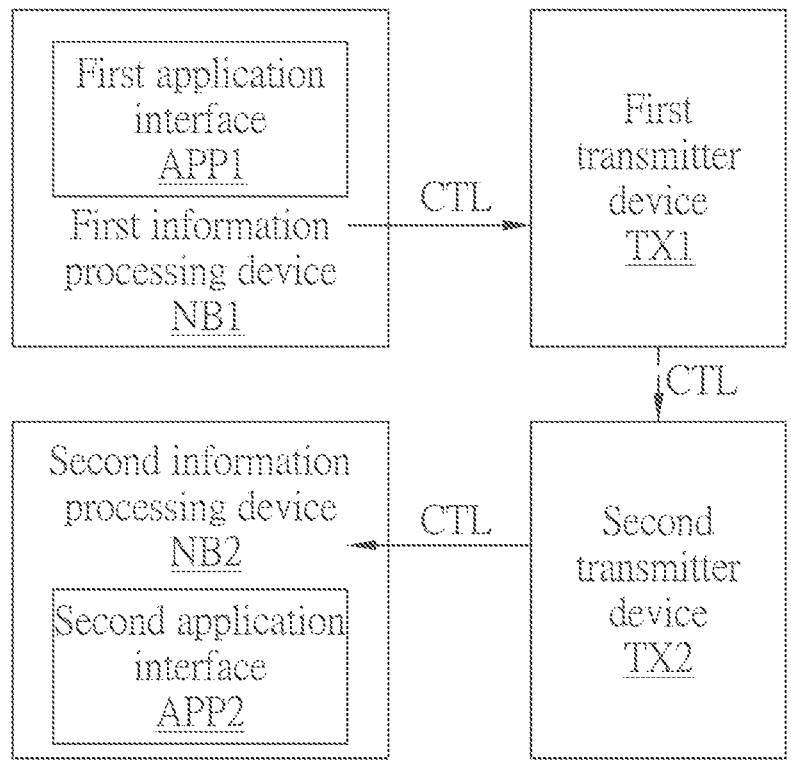

FIG. 5B illustrates a schematic diagram that the control signal sent by the first application interface of the first information processing device is sequentially transmitted to the second information processing device through the first transmitter device and the second transmitter device to disable at least one function of the second application interface of the second information processing device.

Figure 5C:
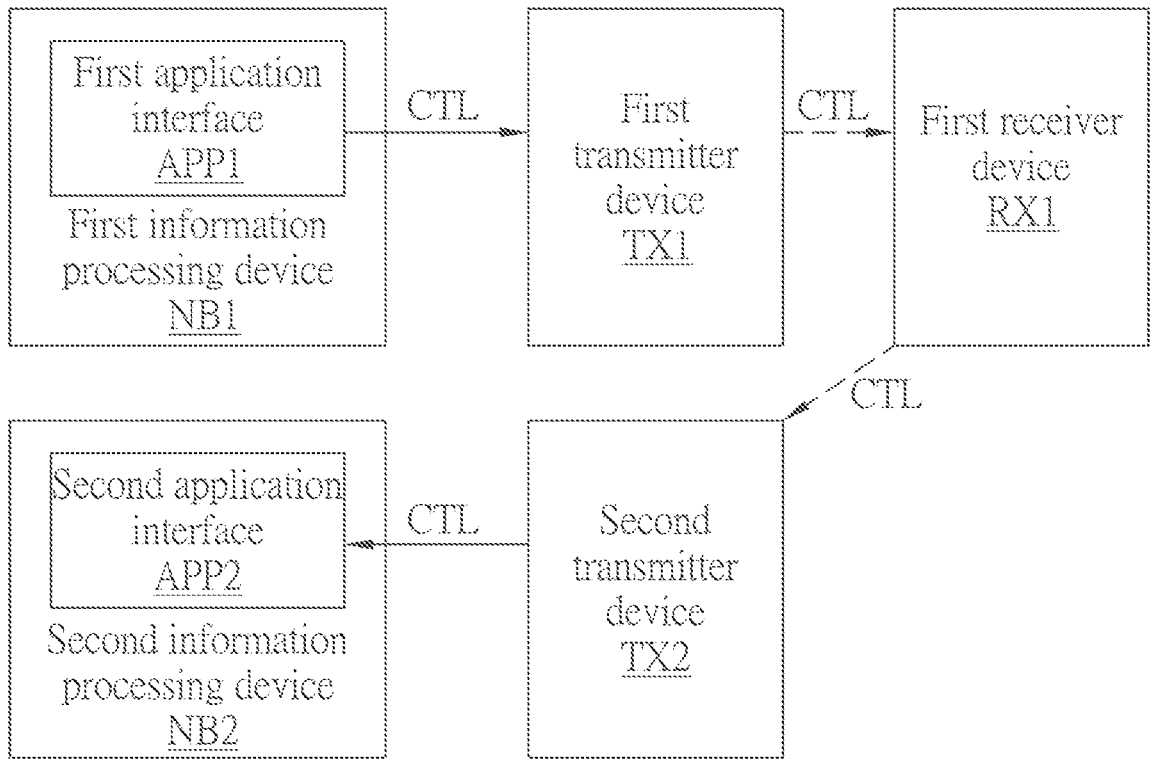

FIG. 5C illustrates a schematic diagram that the control signal sent by the first application interface of the first information processing device is sequentially transmitted to the second information processing device through the first transmitter device, the first receiver device and the second transmitter device to disable at least one function of the second application interface of the second information processing device.

Figure 6A:
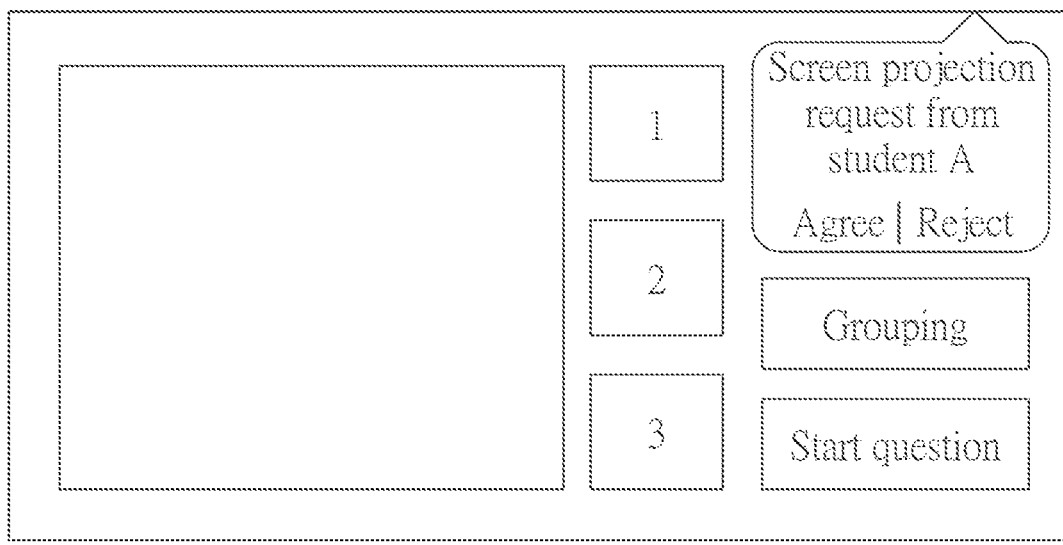

FIG. 6A illustrates an embodiment of a first application interface provided by the first application driver of the first information processing device according to the first authority.

Figure 6B:
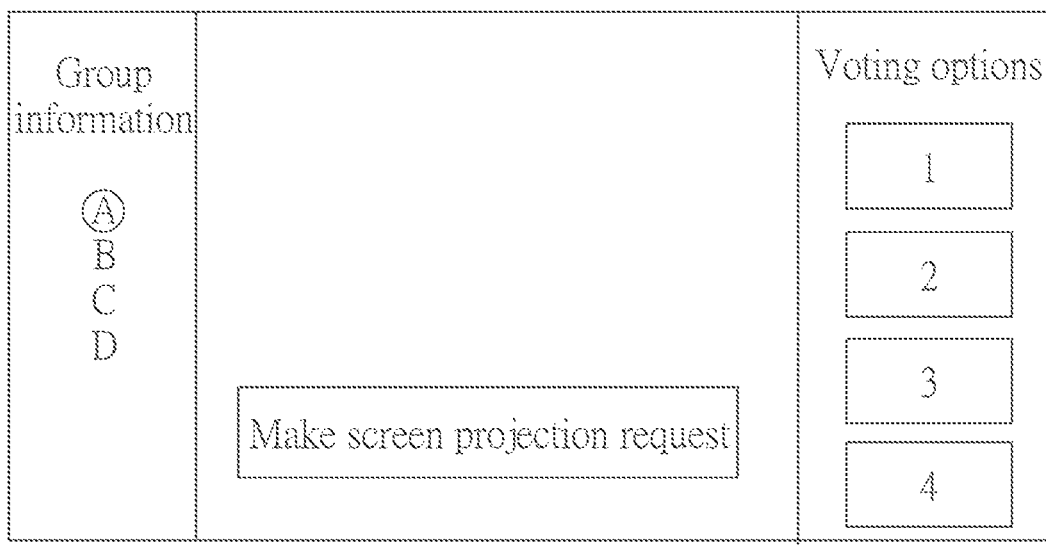

FIG. 6B illustrates an embodiment of a second application interface provided by the second application driver of the second information processing device according to the second authority.

Figure 7A:
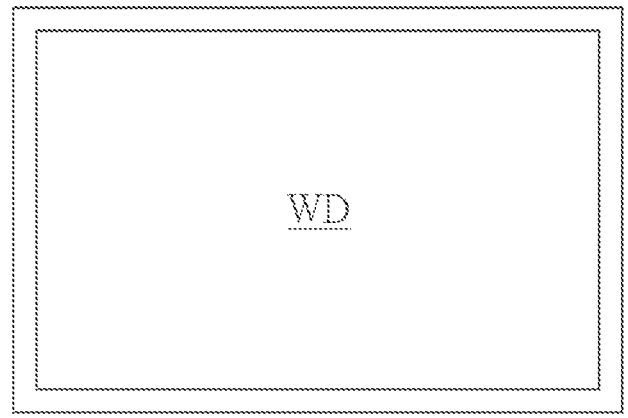
Figure 7B:
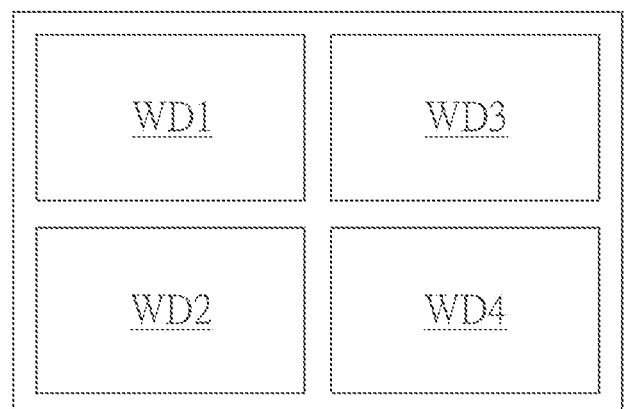

FIG. 7A and FIG. 7B illustrate schematic diagrams that the first application interface of the first information processing device controls the display to display one or more projection windows in a projection display mode through the receiver device respectively.

Figure 8:
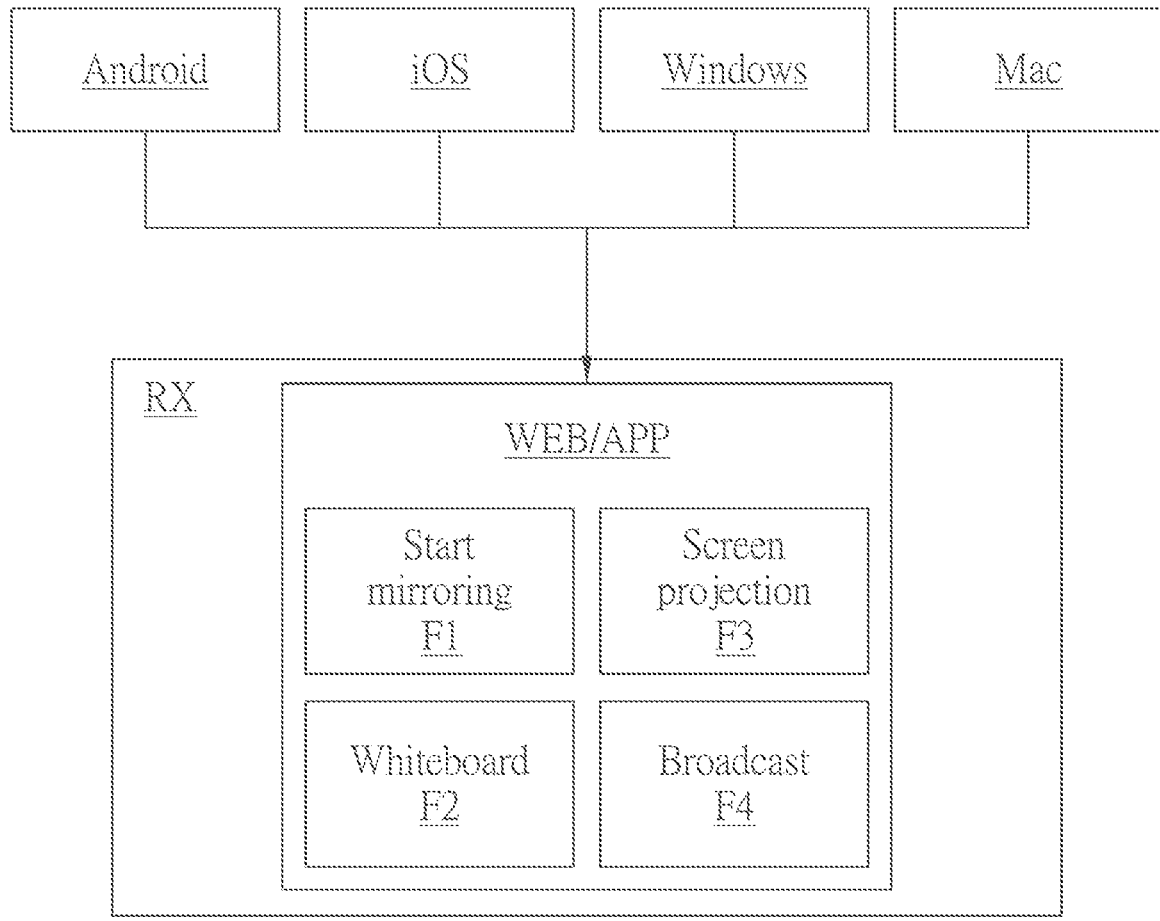

FIG. 8 illustrates a schematic diagram that different operating system platforms in the same domain can directly execute different functions through the website or the application of the receiver device.

Figure 9:
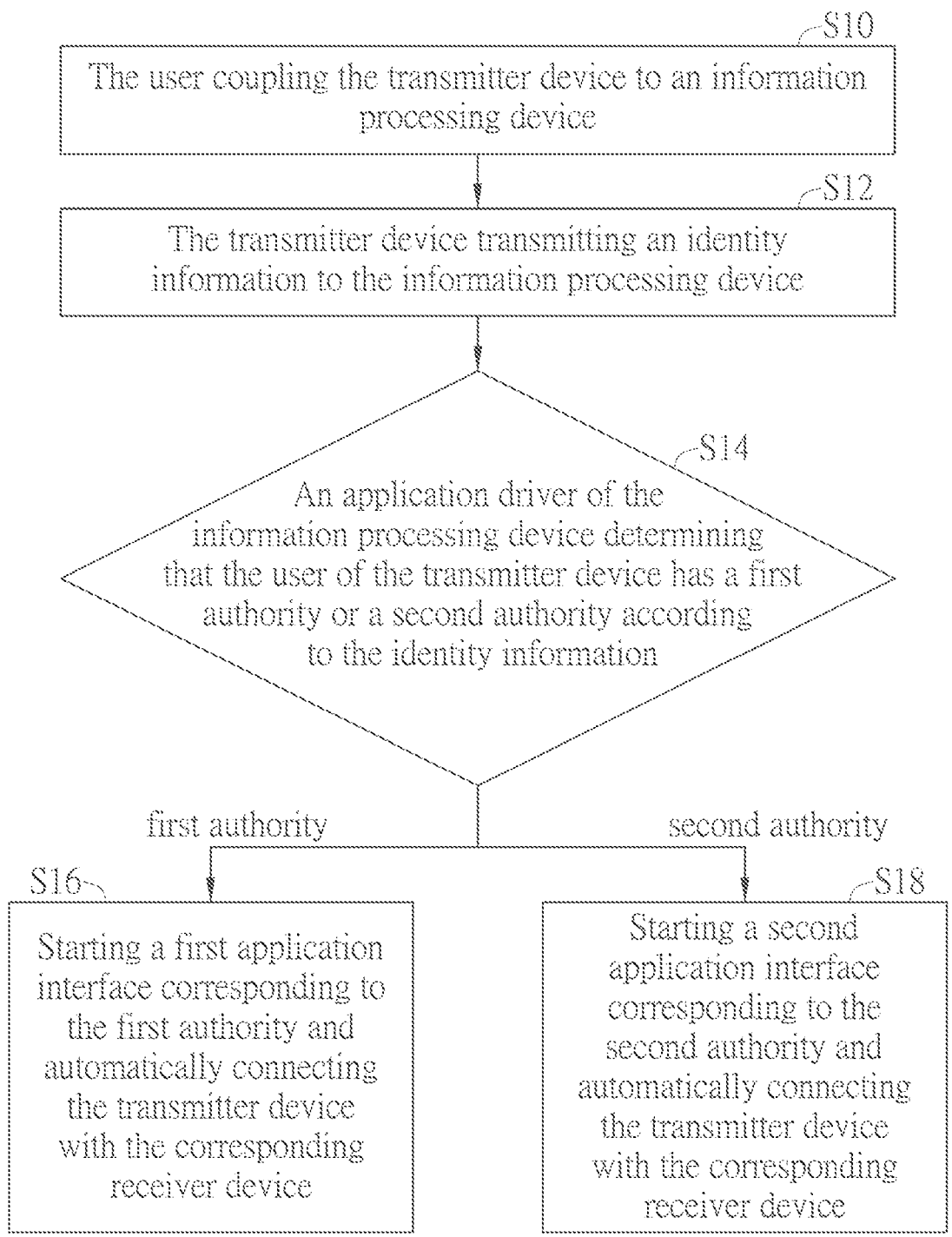

FIG. 9 illustrates a flowchart of the automatic identification method applied to a video conference system in another preferred embodiment of the invention.

DETAILED DESCRIPTION OF THE INVENTION

A preferred embodiment of the invention is a transmitter device applied to a video conference system. In practical applications, the transmitter device can be applied to various types of video conference situations, but not limited to this.

Figure 1:
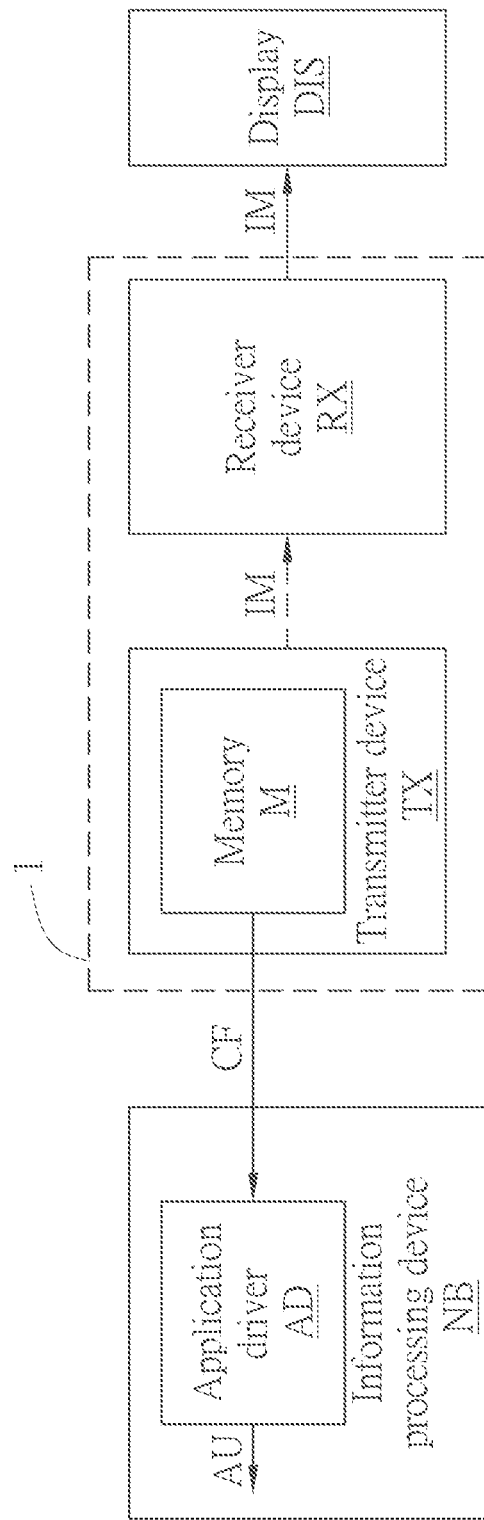
FIG. 1 illustrates a schematic diagram of a transmitter device applied to a video conference system in a preferred embodiment of the invention.

Please refer to FIG. 1. FIG. 1 illustrates a schematic diagram of a transmitter device applied to a video conference system in this embodiment. As shown in FIG. 1, the video conference system 1 includes a transmitter device TX and a receiver device RX. The transmitter device TX includes a memory M storing an identity information CF, and the identity information CF corresponds to an authority AU of the transmitter device TX. When the transmitter device TX is coupled to an information processing device NB, the transmitter device TX transmits the identity information CF to the information processing device NB. When the information processing device NB receives the identity information CF from the transmitter device TX, an application driver AD of the information processing device NB will automatically determine an authority AU of the transmitter device TX according to the identity information CF.

In this embodiment, the transmitter device TX will automatically connect with the corresponding receiver device RX (for example, through the WiFi connection in the classroom or the company, but not limited to this) and wirelessly transmit the video signal IM to the receiver device RX. The receiver device RX is coupled to the display DIS. When the receiver device RX wirelessly receives the image signal IM transmitted from the transmitter device TX, the receiver device RX transmits the image signal IM to the display DIS for display.

In practical applications, the information processing device NB can be a notebook computer, a desktop computer, a tablet computer or other devices with information processing functions, but not limited to this. The display DIS can be a projector, a TV, a touch screen or other devices having a display function, but not limited to this.

It should be noted that the application driver AD installed in the information processing device NB can obtain the transmitter device TX and its authority AU corresponding to the identity information CF from a list of transmitter devices (TX) stored in it, or the application driver AD installed in the information processing device NB can determine the level of the authority AU of the user corresponding to the transmitter device TX according to the role information (such as teacher or student, supervisor or subordinate, presenter or listener, etc.) in the identity information CF provided by the transmitter device TX and perform subsequent actions according to the authority AU of the user, but not limited to this.

In another embodiment, the video conferencing system can also include a plurality of transmitter devices corresponding to different user identities and authorities respectively. In practical applications, the plurality of transmitter devices can be applicable to various types of video conference situations, but not limited to this.

Figure 2:
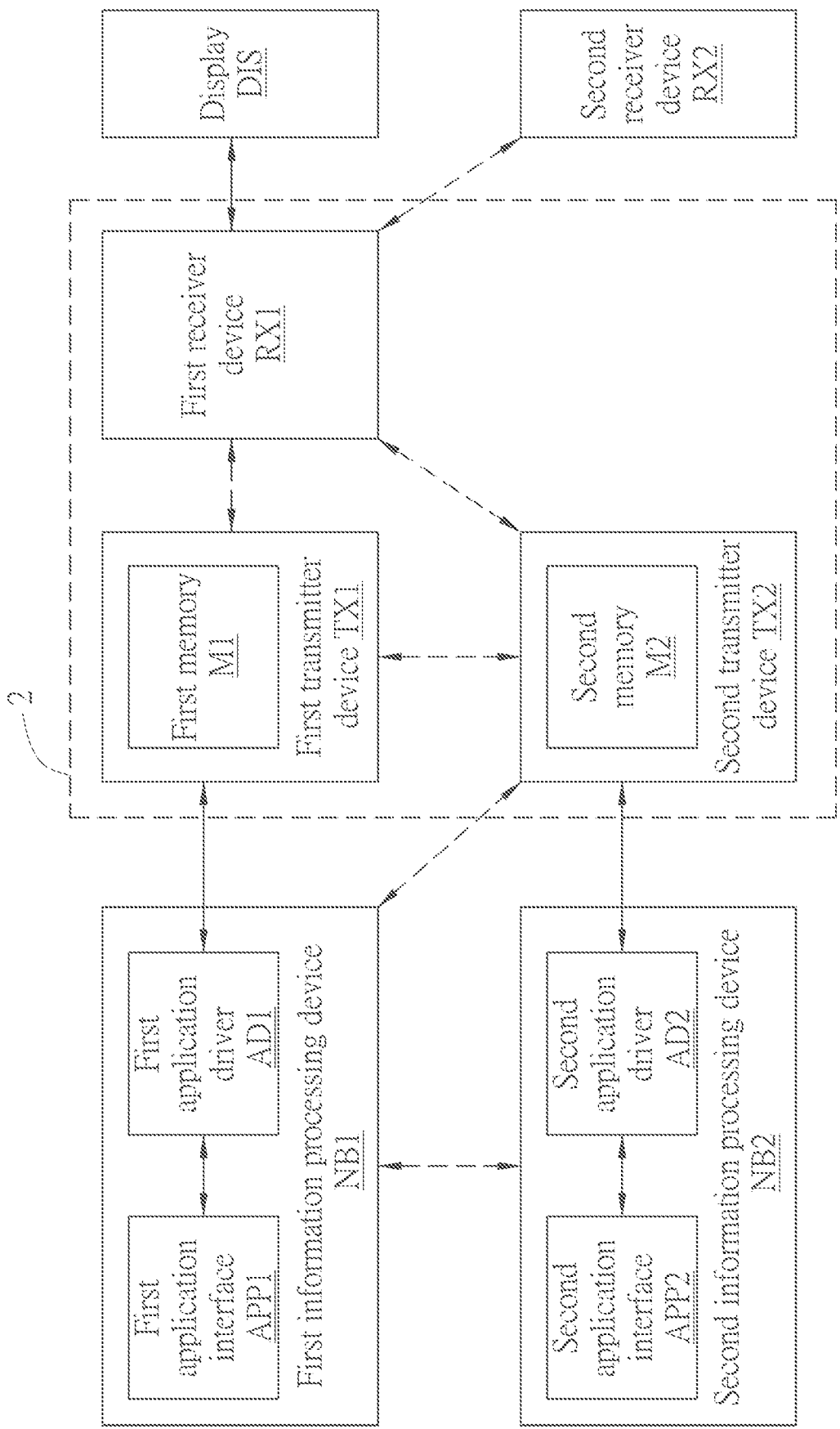
FIG. 2 illustrates a schematic diagram of a first transmitter device and a second transmitter device applied to a video conference system in another preferred embodiment of the invention.

As shown in FIG. 2, the video conference system 2 includes a first transmitter device TX1, a second transmitter device TX2 and a first receiver device RX1. The first receiver device RX1 can be coupled to the display DIS. The first receiver device RX1 can also be wirelessly connected to the first transmitter device TX1, the second transmitter device TX2 and the second receiver device RX2. The first transmitter device TX1 can be coupled to the first information processing device NB1. The first transmitter device TX1 can also be wirelessly connected to the first receiver device RX1 and the second transmitter device TX2. The second transmitter device TX2 can be coupled to the second information processing device NB2. The second transmitter device TX2 can also be wirelessly connected to the first receiver device RX1, the first transmitter device TX1 and the first information processing device NB1.

Figure 3A:
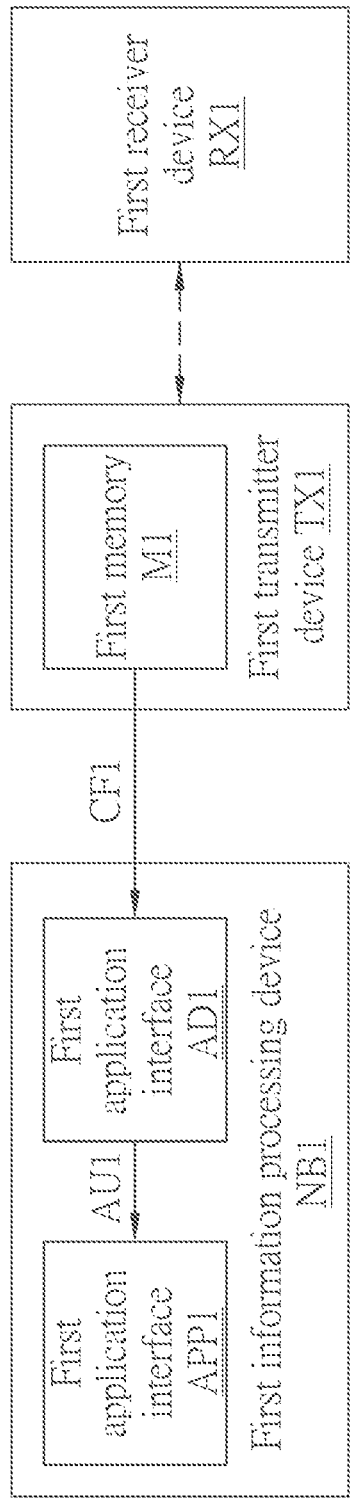
FIG. 3A illustrates a schematic diagram that when the first transmitter device is coupled to a first information processing device, the first application driver determines a first authority of the first transmitter device according to a first identity information transmitted by the first transmitter device.

As shown in FIG. 3A, the first transmitter device TX1 includes a first memory M1 storing a first identity information CF1, and the first identity information CF1 corresponds to a first authority AU1 of the first transmitter device TX1. When the first transmitter device TX1 is coupled to the first information processing device NB1, the first transmitter device TX1 transmits the first identity information CF1 to the first information processing device NB1. When the first information processing device NB1 receives the first identity information CF1 transmitted from the first transmitter device TX1, a first application driver AD1 of the first information processing device NB1 will automatically determine a first authority AU1 of the transmitter device TX1 according to the first identity information CF1 and correspondingly provides a first application interface APP1 to the first transmitter device TX1 according to the first authority AU1.

In practical applications, the first application driver AD1 can correspondingly activate the first application interface APP1 originally stored in the first information processing device NB1 according to the first authority AU1, or the first application driver AD1 can correspondingly download the first application interface APP1 to the first information processing device NB1 according to the first authority AU1 and activate the first application interface APP1 after the download is completed, but not limited to this.

Figure 3B:
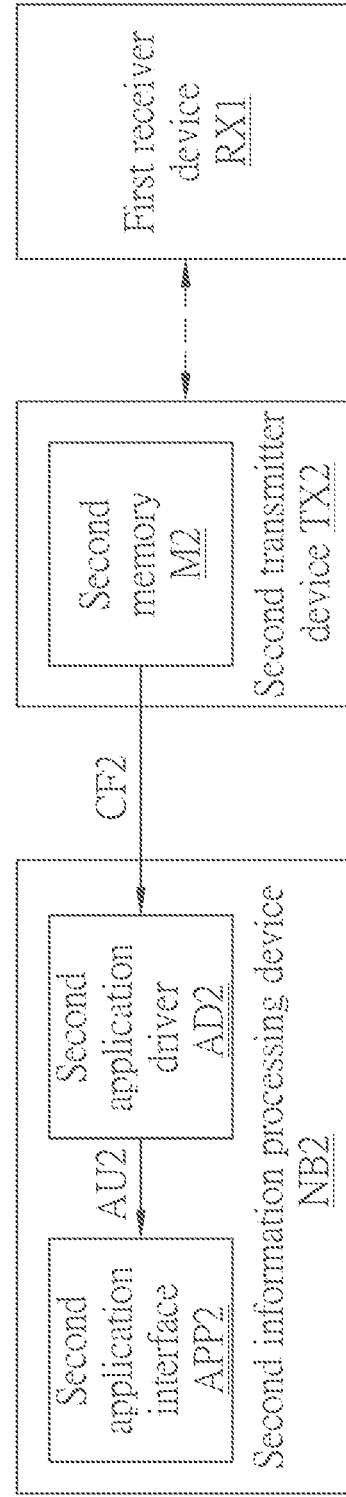
FIG. 3B illustrates a schematic diagram that when the second transmitter device is coupled to a second information processing device, the second application driver determines a second authority of the second transmitter device according to a second identity information transmitted by the second transmitter device.

Similarly, as shown in FIG. 3B, the second transmitter device TX2 includes a second memory M2 storing a second identity information CF2, and the second identity information CF2 corresponds to a second authority AU2 of the second transmitter device TX2. When the second transmitter device TX2 is coupled to the second information processing device NB2, the second transmitter device TX2 transmits the second identity information CF2 to the second information processing device NB2. When the second information processing device NB2 receives the second identity information CF2 transmitted from the second transmitter device TX2, the second application driver AD2 of the second information processing device NB2 will automatically determine a second authority AU2 of the second transmitter devices TX2 according to the second identity information CF2 and correspondingly provide a second application interface APP2 to the second transmitter device TX2 according to the second authority AU2.

In practical applications, the second application driver AD2 can correspondingly activate the second application interface APP2 originally stored in the second information processing device NB2 according to the second authority AU2, or the second application driver AD2 can correspondingly download the second application interface APP2 to the second information processing device NB2 according to the second authority AU2 and activate the second application interface APP2 after the download is completed, but not limited to this.

It should be noted that the first application interface APP1 corresponding to the first authority AU1 and the second application interface APP2 corresponding to the second authority AU2 can be substantially two different applications or two different operating interfaces in the same application without specific restrictions.

In an embodiment, it is assumed that the level of the first authority AU1 (e.g., teacher authority) of the first transmitter device TX1 is higher than the level of the second authority AU2 (e.g., student authority) of the second transmitter device TX2, then the first application interface APP1 of the first information processing device NB1 can send a control signal CTL to control the function of the second transmitter device TX2, but not limited to this.

For example, as shown in FIG. 4A, the control signal CTL sent by the first application interface APP1 of the first information processing device NB1 can be transmitted to the second transmitter device TX2 through the first transmitter device TX1 to disable at least one function of the second transmitter device TX2, but not limited to this.

As shown in FIG. 4B, if the first information processing device NB1 and the second transmitter device TX2 are in the same network domain, the control signal CTL sent by the first application interface APP1 of the first information processing device NB1 can be directly transmitted to the second transmitter device TX2 through the network domain to disable at least one function of the second transmitter device TX2, but not limited to this.

As shown in FIG. 4C, the control signal CTL sent by the first application interface APP1 of the first information processing device NB1 can be sequentially transmitted to the second transmitter device TX2 through the first transmitter device TX1 and the first receiver device RX1 to disable at least one function of the second transmitter device TX2, but not limited to this.

As shown in FIG. 4D, the control signal CTL sent by the first application interface APP1 of the first information processing device NB1 can be transmitted to the first receiver device RX1 through the first transmitter device TX1, so that although the first receiver device RX1 receives a second image signal IM2 provided by the second transmitter device TX2, the first receiver device RX1 does not provide the second image signal IM2 to the display DIS for display, but not limited to this.

As shown in FIG. 4E, the control signal CTL sent by the first application interface APP1 of the first information processing device NB1 can be directly transmitted to the first receiver device RX1, so that although the first receiver device RX1 has received the second image signal IM2 provided by the second transmitter device TX2, the first receiver device RX1 does not provide the second image signal IM2 to the display DIS for display, but not limited to this.

Please refer to FIG. 4F and FIG. 4G. FIG. 4F illustrates a schematic diagram of the appearance of a second transmitter device having a connection line supporting universal serial bus (USB) and high-definition multimedia interface (HDMI); FIG. 4G illustrates a schematic diagram of the appearance of the second transmitter device having the connection line supporting USB Type-C alternate mode. As shown in FIG. 4F and FIG. 4G, the second transmitter device TX can have a physical button BUT, and the button BUT can be used to notify the receiver device RX to output the second image signal IM2, transmitted from the second information processing device NB2, to the display DIS, and the control signal CTL sent by the first application interface APP1 of the first information processing device NB1 can be used to disable the button BUT of the second transmitter device TX, but not limited to this.

It should be noted that the "disabling at least one function of the second transmitter device TX2" in the previous embodiment can be, for example: prohibiting the second transmitter device TX2 from projecting, prohibiting the second transmitter device TX2 from wirelessly outputting of audio and video packets, or prohibiting the button BUT of the second transmitter device TX2 from being triggered by the user pressing (as shown in FIG. 4F and FIG. 4G), but not limited to this.

In another embodiment, it is assumed that the level of the first authority AU1 (e.g., teacher authority) of the first transmitter device TX1 is higher than the level of the second authority AU2 (e.g., student authority) of the second transmitter device TX2, then the first application interface APP1 of the first information processing device NB1 can also send the control signal CTL to disable at least one function of the second application interface APP2 of the second information processing device NB2, but not limited to this.

For example, as shown in FIG. 5A, the control signal CTL sent by the first application interface APP1 of the first information processing device NB1 can be directly transmitted to the second information processing device NB2 to disable at least one function of the second application interface APP2 of the second information processing device NB2, but not limited to this.

As shown in FIG. 5B, the control signal CTL sent by the first application interface APP1 of the first information processing device NB1 can be sequentially transmitted to the second information processing device NB2 through the first transmitter device TX1 and the second transmitter device TX2 to disable at least one function of the second application interface APP2 of the second information processing device NB2, but not limited to this.

As shown in FIG. 5C, the control signal CTL sent by the first application interface APP1 of the first information processing device NB1 can be sequentially transmitted to the second information processing device NB2 through the first transmitter device TX1, the first receiver device RX1 and the second transmitter device TX2 to disable at least one function of the second application interface APP2 of the second information processing device NB2, but not limited to this.

Please refer to FIG. 6A and FIG. 6B. FIG. 6A illustrates an embodiment of the first application interface APP1 provided by the first application driver AD1 of the first information processing device NB1 according to the first authority AU1; FIG. 6B illustrates an embodiment of the second application interface APP2 provided by the second application driver AD2 of the second information processing device NB2 according to the second authority AU2.

As shown in FIG. 6A and FIG. 6B, it is assumed that the level of the first authority AU1 (e.g., teacher authority) of the first transmitter device TX1 is higher than the level of the second authority AU2 (e.g., student authority) of the second transmitter device TX2, the number of functions (for example, grouping, starting a question, agreeing/rejecting the screen projection request of students, switching display screens, etc.) of the first application interface APP1 provided by the first application driver AD1 of the first information processing device NB1 according to the first authority AU1 (e.g., teacher authority) will be more than the number of functions (for example, sending screen projection request, displaying groups, etc.) of the second application interface APP2 provided by the second application driver AD2 of the second information processing device NB2 according to the second authority AU2 (e.g., student authority), and the operation requests (such as screen projection requests) sent by students through the second application interface APP2 need to be approved by the teacher through the first application interface APP1 before performing subsequent actions, but not limited to this.

In addition, the first application interface APP1 of the first information processing device NB1 with a higher authority level can control a screen projection display mode of the display DIS through the first receiver device RX1; for example, the teacher can operate the first application interface APP1 to designate the display DIS to display a single projection window WD (as shown in FIG. 7A) or multiple projection windows WD1~WD4 (as shown in FIG. 7B) in the screen projection display mode, but not limited to this.

When the second application interface APP2 of the second information processing device NB2 with a lower authority level sends a screen projection request to the first receiver device RX1, the first receiver device RX1 will first notify the first application interface APP1 of the first information processing device NB1 with a higher authority level, and after the approval of the first application interface APP1, the first receiver device RX1 will only transmit the projection screen provided by the second application interface APP2 to the display DIS for display according to the screen projection request, but not limited to this.

Next, an actual classroom situation will be taken as an example for detailed description.

Assuming that there is a teacher (Host) and multiple students (Guest) in the same classroom, when the first transmitter device TX1 with the first authority AU1 (higher authority level) is coupled to the first information processing device NB1 by the teacher (Host), the first application driver AD1 of the first information processing device NB1 will provide the first application interface APP1 as shown in FIG. 6A for the teacher (Host) to use according to the first authority AU1, and the first transmitter device TX1 will automatically connect with the first receiver device RX1 in this classroom to simplify the original complicated pre-setting process; when the second transmitter device TX2 with the second authority AU2 (lower authority level) is coupled to the second information processing device NB2 by the student (Guest), the second application driver AD2 of the second information processing device NB2 will provide the second application interface APP2 shown in FIG. 6B for the students (Guest) to use according to the second authority AU2, and the second transmitter device TX2 will automatically connect with the first receiver device RX1 in the classroom, so as to simplify the original complicated pre-setting process.

Under the above-mentioned classroom situation, the invention can realize at least the following three functions:

Function 1: Both the teacher (Host) and the student (Guest) can use the screen projection function, but the screen projection function of the student (Guest) will be limited by the teacher (Host).

For example, in the single-window screen projection mode shown in FIG. 7A, the screen presentation way of all participants in the meeting is similar to the screen of Google Meet, but only the teacher (Host) can designate a single screen to be projected to the display DIS through the first application interface APP1. In the split-window screen projection mode shown in FIG. 7B, the screen presentation way of all participants is similar to that of Google Meet, but only the teacher (Host) can designate the split-screen to be projected to the display DIS through the first application interface APP1.

Function 2: The teacher (Host) can agree/reject the operation request made by the student (Guest).

For example, no matter in the single-window screen projection mode shown in FIG. 7A or the split-window screen projection mode shown in FIG. 7B, the teacher (Host) can project the screen of himself/herself or any student (Guest) to the display DIS. If the student (Guest) wants to share his screen to the display DIS, he/she can send a screen projection request through the second application interface APP2 as shown in FIG. 6B. When the teacher (Host) receives the student's screen projection request message through the first application interface APP1 shown in FIG. 6A, the teacher (Host) can choose to agree or reject the student's screen projection request for subsequent actions.

Function 3: The teacher (Host) can use the functions of grouping and starting voting, while the students only have the function of voting.

For example, when classroom activities need to be grouped, the teacher (Host) can use the first application interface APP1 as shown in FIG. 6A to group the online students (Guest), and the students (Guest) can immediately see the grouping information of which group he/she is assigned to on the second application interface APP2 as shown in FIG. 6B. In addition, the teacher (Host) can also start questions and options through the first application interface APP1 as shown in FIG. 6A when teaching in the classroom, and the student (Guest) can instantly use the second application interface APP2 as shown in FIG. 6B to see the questions and options and votes, and finally the teacher (Host) can see the voting results of the students (Guest) through the first application interface APP1.

It should be noted that although the above-mentioned embodiments are described by taking teachers and students conducting a video conference in a classroom situation as an example, the invention can also be applied to, for example, presenters and listeners who conduct a video conference in a lecture situation, supervisors and subordinates who conduct video conferencing within the company, or any other video conferencing situation can be applied without specific restrictions.

In practical applications, as shown in FIG. 8, different operating system platforms (such as Android, iOS, Windows, Mac, etc.) can directly use the website WEB/application APP of the receiver device RX with control command and position vector functions in the same network domain to perform different functions (such as start mirroring F1, whiteboard F2, screen projection F3, broadcast F4, etc.), so as to improve the compatibility and convenience of the actual operation of the video conference system, but not limited to this.

Another embodiment of the invention is an automatic identification method applied to a video conference system. In practical applications, the automatic identification method can be applied to various types of video conference situations, but not limited to this.

Please refer to FIG. 9. FIG. 9 illustrates a flowchart of the automatic identification method in this embodiment. As shown in FIG. 9, the automatic identification method can include the following steps:

Step S10: the user couples a transmitter device to an information processing device;

Step S12: the transmitter device transmits an identity information to the information processing device;

Step S14: an application driver of the information processing device determines that the user of the transmitter device has a first authority or a second authority according to the identity information;

Step S16: if the determination result of Step S14 is that the user has the first authority, then a first application interface corresponding to the first authority is started and the transmitter device is automatically connected with the corresponding receiver device; and Step S18: if the determination result of Step S14 is that the user has the second authority, then a second application interface corresponding to the second authority is started and the transmitter device is automatically connected with the corresponding receiver device.

For example, it is assumed that there is a wireless projection device (RX) in the classroom, and applications have pre-installed on the notebooks of a teacher (Host) and a plurality of students (Guest). When the teacher (Host) inserts the teacher version transmitter device (Host TX) into the notebook, the teacher version transmitter device (Host TX) will transmit the identity information of the teacher (Host) to the notebook. The application driver of the notebook will determine the authority of the teacher (Host) according to the identity information of the teacher (Host) and correspondingly activate the application interface of the teacher (Host) for the teacher (Host) to use, and at the same time enable the teacher version transmitter device (Host TX) to be automatically connected to the wireless projection device (RX) through the wireless network in the classroom to simplify the original complicated pre-setting process, so that the teacher version transmitter device (Host TX) can be coupled to the notebook computer to achieve the effect of "plug and play".

Similarly, when the student (Guest) inserts the student version transmitter device (Guest TX) into the notebook, the student version transmitter device (Guest TX) will transmit the student (Guest) identity information to the notebook. The application driver of the notebook will determine the authority of the student (Guest) according to the identity information of the student (Guest) and activate the application interface of the student (Guest) correspondingly for the student (Guest) to use, and at the same time enable the student version transmitter device (Guest TX) to be automatically connected to the wireless projection device (RX) through the wireless network in the classroom, so as to simplify the original complicated pre-setting process, so that the student version transmitter device (Guest TX) can be coupled to the notebook computer to achieve the effect of "plug and play".

It should be noted that, since the teacher version transmitter device (Host TX), the student version transmitter device (Guest TX) and the wireless projection device (RX) are respectively defined with their own identity data (Config); therefore, when the teacher version transmitter device (Host TX) or the student version transmitter device (Guest TX) is inserted into the notebook computer, the application driver of the notebook can automatically identify the identity of the teacher (Host) or the student (Guest) and automatically activate its dedicated application interface, and also automatically establish the connection between the teacher version transmitter device (Host TX) or the student version transmitter device (Guest TX) and the wireless projection device (RX).

In an embodiment, the identity data (RX Config) of the wireless projection device can be stored in the application driver of the notebook computer, when the teacher version transmitter device (Host TX) or the student version transmitter device (Guest TX)) is plugged into a notebook, the application driver of the notebook can compare the identity data (RX Config) of the wireless projection device with the identity data (Host TX Config) of the teacher version transmitter device or the identity data (Guest TX Config) of the student version transmitter device, if the match is successful, it will automatically activate its dedicated application interface and automatically establish a connection between teacher version transmitter device (Host TX) or student version transmitter device (Guest TX) and the wireless projection device (RX).

In another embodiment, when the teacher version transmitter device (Host TX) or the student version transmitter device (Guest TX) is inserted into the notebook, the application driver of the notebook can obtain the identity data (RX Config) of the wireless projection device from the wireless projection device (RX), and compare a transmitter device match list in the identity data (RX Config) of the wireless projection device with the identity data (Host TX Config) of the teacher version transmitter device or the identity data (Guest TX Config) of the student version transmitter device. If the match is successful, its dedicated application interface will be automatically activated and the connection between the teacher version transmitter device (Host TX) or the student version transmitter device (Guest TX) and the wireless projector (RX) will be automatically established at the same time.

It should be noted that although the above-mentioned embodiments are described by taking teachers and students conducting a video conference in a classroom situation as an example, the invention can also be applied to presenters and listeners who conduct a video conference in a lecture situation; for example, supervisors and subordinates who conduct video conferencing within the company, or any other video conferencing situation can be applied without specific restrictions.

Compared with the prior art, the invention can not only automatically identify the unique identities of the transmitter devices (TX) of different users and automatically provide dedicated application interfaces with corresponding authorities in the video conference situation, but also enable the transmitter device to be automatically connected to the correct receiver device (RX), which greatly simplifies the original complicated video conference pre-setting process, so that the effect of "plug and play" can be achieved when the transmitter devices of different users are coupled to the information processing devices. In addition, it can be compatible with different operating system platforms (such as Android, iOS, Windows, Mac, etc.) used by different participants through the receiver device (RX) with control commands and position vector functions; therefore, the convenience and satisfaction of users when operating in the video conference situation can be effectively improved.

What is claimed is:

1. A first transmitter device, applied to a video conference system, the video conference system further comprising a receiver device, the receiver device wirelessly receiving a first image signal transmitted by the first transmitter device and the first image signal being displayed by a display coupled to the receiver device, the first transmitter device comprising:
a first memory storing a first identity information corresponding to a first authority of the first transmitter device;
wherein when the first transmitter device is coupled to a first information processing device, the first transmitter device transmits the first identity information to the first information processing device, and a first application driver of the first information processing device determines the first authority of the first transmitter device according to the first identity information; the first application driver also correspondingly provides a first application interface to the first transmitter device according to the first authority, or the first application driver activates the first application interface originally stored in the first information processing device according to the first authority, or the first application driver correspondingly downloads the first application interface to the first information processing device according to the first authority and then activates the first application interface, the first application interface of the first information processing device sends a control signal to control a function of a second transmitter device.

2. The first transmitter device of claim 1, wherein the second transmitter device has a physical button, and the physical button is used to notify the receiver device to output a second image signal transmitted from the second information processing device to the display, and the control signal is used to disable the physical button.

3. The first transmitter device of claim 1, wherein the second transmitter device comprises a second memory for storing a second identity information corresponding to a second authority of the second transmitter device.

4. The first transmitter device of claim 3, wherein when the second transmitter device is coupled to the second information processing device, the second transmitter device transmits the second identity information to the second information processing device, and an application driver of the second information processing device determines the second authority of the second transmitter device according to the second identity information.

5. The first transmitter device of claim 4, wherein the second application driver of the second information processing device further provides a second application interface to the second transmitter device according to the second authority, or the second application driver correspondingly activates the second application interface originally stored in the second information processing device according to the second authority, or the second application driver correspondingly downloads the second application interface to the second information processing device according to the second authority and activates the second application interface.

6. The first transmitter device of claim 5, wherein the first application interface of the first information processing device sends a control signal to disable at least one function of the second application interface of the second information processing device.

7. The first transmitter device of claim 6, wherein the number of functions of the first application interface is greater than the number of functions of the second application interface.

8. The first transmitter device of claim 6, wherein an operation request sent by the second application interface can only be performed after the first application interface agrees.

9. The first transmitter device of claim 3, wherein a level of the first authority of the first transmitter device is higher than a level of the second authority of the second transmitter device.

10. The first transmitter device of claim 1, wherein the control signal is transmitted from the first information processing device to the second transmitter device through the first transmitter device or the control signal is directly transmitted from the first information processing device to the second transmitter device to disable at least one function of the second transmitter device.

11. The first transmitter device of claim 1, wherein the first transmitter device and the second transmitter device are both connected with the receiver device, and the control signal is transmitted from the first information processing device to the receiver device through the first transmitter device or the control signal is directly transmitted from the first information processing device to the receiver device, so the receiver device receives the second image signal provided by the second transmitter device but does not provide the second image signal to the display for display, or the control signal is sequentially sent from the first information processing device to the second transmitter device through the first transmitter device and the receiver device to disable at least one function of the second transmitter device.

12. The first transmitter device of claim 1, wherein the first information processing device and the second transmitter device are both in the same network domain, and the first information processing device transmits the control signal to the second transmitter device through the network domain to disable at least one function of the second transmitter device.

13. The first transmitter device of claim 1, wherein the first application driver of the first information processing device obtains the first transmitter device and its first authority corresponding to the first identity information from a transmitter device list stored therein.

14. The first transmitter device of claim 1, wherein the first application driver of the first information processing device determines the first authority corresponding to the first transmitter device according to a role information provided by the first transmitter device.

15. A first transmitter device, applied to a video conference system, the video conference system further comprising a receiver device, the receiver device wirelessly receiving a first image signal transmitted by the first transmitter device and the first image signal being displayed by a display coupled to the receiver device, the first transmitter device comprising:

a first memory storing a first identity information corresponding to a first authority of the first transmitter device;

wherein when the first transmitter device is coupled to a first information processing device, the first transmitter device transmits the first identity information to the first information processing device, and a first application driver of the first information processing device determines the first authority of the first transmitter device according to the first identity information; the first application driver also correspondingly provides a first application interface to the first transmitter device according to the first authority, or the first application driver activates the first application interface originally stored in the first information processing device according to the first authority, or the first application driver correspondingly downloads the first application interface to the first information processing device according to the first authority and then activates the first application interface, the first application interface controls a screen projection display mode of the display through the receiver device and designates the display to display one or more screen projection windows in the screen projection display mode.

16. The first transmitter device of claim 15, wherein when the second application interface sends a screen projection request to the receiver device, the receiver device needs to be approved by the first application interface before transmitting a projection screen of the second application interface to the display for display according to the screen projection request.

17. A first transmitter device, applied to a video conference system, the video conference system further comprising a receiver device, the receiver device wirelessly receiving a first image signal transmitted by the first transmitter device and the first image signal being displayed by a display coupled to the receiver device, the first transmitter device comprising:

a first memory storing a first identity information corresponding to a first authority of the first transmitter device;

wherein when the first transmitter device is coupled to a first information processing device, the first transmitter device transmits the first identity information to the first information processing device, and a first application driver of the first information processing device determines the first authority of the first transmitter device according to the first identity information; the receiver device has functions of control commands and location vectors, so that different operating system platforms in the same network domain can directly control related operations through websites or applications.

* * * * *